United States Patent
Krauss et al.

(10) Patent No.: US 7,027,527 B2
(45) Date of Patent: Apr. 11, 2006

(54) EXCESS DELAY SPREAD DETECTION METHOD FOR MULTI-CARRIER COMMUNICATION SYSTEMS

(75) Inventors: Thomas Krauss, Algonquin, IL (US); Sandeep Mukthavaram, Schaumburg, IL (US); Kevin Baum, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 224 days.

(21) Appl. No.: 10/309,985

(22) Filed: Dec. 4, 2002

(65) Prior Publication Data

US 2004/0109515 A1 Jun. 10, 2004

(51) Int. Cl.
*H03K 9/00* (2006.01)
(52) U.S. Cl. ...................................... 375/316
(58) Field of Classification Search ............... 375/343, 375/142, 143, 150, 152, 316, 340, 147, 136; 455/101
See application file for complete search history.

(56) References Cited

U.S. PATENT DOCUMENTS

| | | | |
|---|---|---|---|
| 5,602,484 A | 2/1997 | Suzuki et al. | |
| 6,028,901 A | 2/2000 | Huynh et al. | |
| 6,141,542 A * | 10/2000 | Kotzin et al. | 455/101 |
| 6,522,706 B1 * | 2/2003 | Bahai et al. | 375/343 |
| 2003/0026360 A1 * | 2/2003 | Ramasubramanian et al. | 375/343 |
| 2004/0028007 A1 * | 2/2004 | Sumasu et al. | 370/320 |
| 2004/0042566 A1 * | 3/2004 | Eidson et al. | 375/341 |

* cited by examiner

*Primary Examiner*—Emmanuel Bayard
(74) *Attorney, Agent, or Firm*—Kenneth A. Haas; Jeffrey K. Jacobs

(57) ABSTRACT

A method for detecting a presence of an excess delay spread within a received signal is provided. First, a quantitative estimation of a similarity of two segments of the received signal is performed. Thereafter, the presence of the excess delay spread within the received signal based upon the quantitative estimation is determined. In determining the presence of an excess delay spread, the quantitative estimation can be compared to a detection threshold.

14 Claims, 4 Drawing Sheets

EXCESS DELAY SPREAD DETECTION METHOD FOR MULTI-CARRIER COMMUNICATION SYSTEMS

FIELD OF THE INVENTION

The present invention generally relates to the field of communication systems. More specifically, the invention relates to a method for detecting the presence of an excess delay spread in communication systems.

BACKGROUND OF THE INVENTION

Orthogonal Frequency Division Multiplexing (OFDM) systems generally include a cyclic extension (or guard interval) with each transmitted OFDM symbol. The cyclic extension is intended to eliminate inter-symbol and inter-carrier interference in delay spread channels. However, if the channel impulse response is longer than the cyclic extension, the portion of the impulse response that is outside the extension causes self-interference.

Delay spread detection circuits exist in the art to estimate the delay spread in a radio frequency signal. Most of the existing delay spread sensors are designed for single-carrier systems. For example, a prior art delay spread estimator disclosed in U.S. Pat. No. 5,602,484 A1 detects the presence of an excess delay spread after estimating the channel by an implementation of a matched filter operation. Another prior art delay spread estimator disclosed in U.S. Pat. No. 6,028,901 A1 implements a matched filter operation to estimate the channel and extract the channel's impulse response. However, for multi-carrier systems, a process of channel estimation as proposed by the art is computationally intensive, because it involves a fast Fourier transform ("FFT") followed by an inverse fast Fourier transform ("IFFT") to extract the channel impulse response.

The present invention advances the art by a contribution of a method and a receiver for detecting the presence of an excess delay spread in communication systems.

SUMMARY OF THE INVENTION

The present invention is a method for operating a receiver in detecting a presence of an excess delay spread in a received signal. The received signal originates from a transmitter that occasionally or periodically transmits a signal having two or more adjacent segments that are very similar.

In a first form of the method, a quantitative estimation of a similarity of two segments of a received signal is calculated, and the presence or an absence of an excess delay spread in the received signal based upon the quantitative estimation is subsequently determined.

In a second form of the method, the quantitative estimation is performed, and the presence or the absence of an excess delay spread in the received signal based upon a comparison of the quantitative estimation and a detection threshold is subsequently determined.

The foregoing forms as well as other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
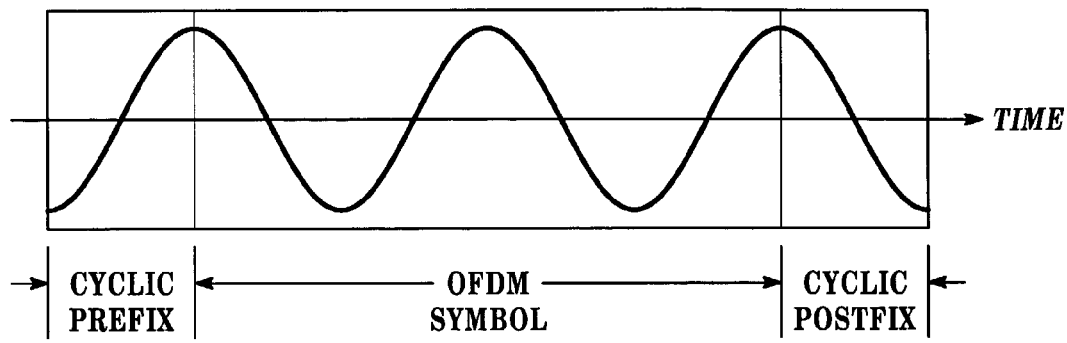
FIG. 1 illustrates a time line of a known OFDM symbol period including a cyclic prefix and a cyclic postfix.

The preferred embodiment of the invention relates to multicarrier communication systems such as, for example, orthogonal frequency division multiplexing ("OFDM") and OFDM variants (e.g. spread OFDM), and can also be used with other types of modulation methods that use a cyclic prefix and/or postfix. An exemplary OFDM symbol 10 with a cyclic prefix and a postfix is illustrated in FIG. 1. Furthermore, a prior art OFDM synchronization symbol format can be used by a transmitter to transmit a signal with two identical segments as exemplary illustrated in FIG. 3.

Figure 2:
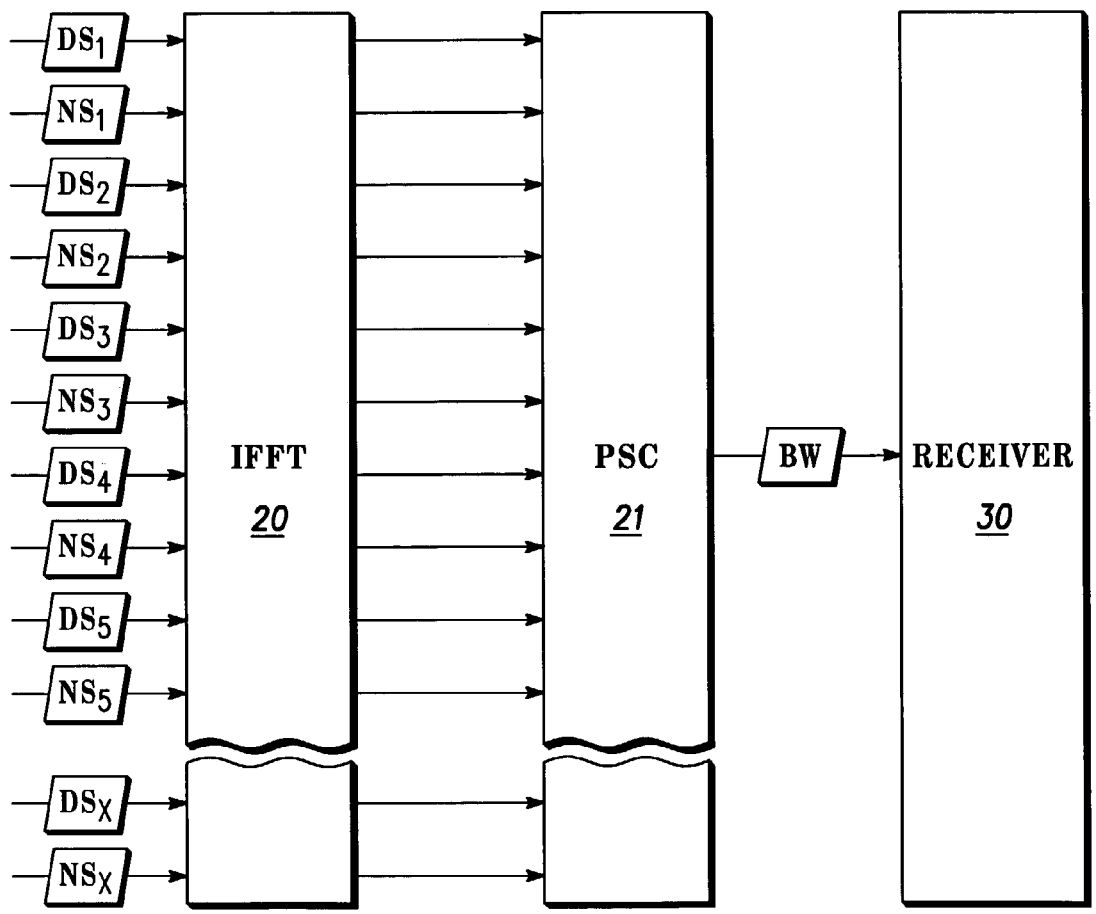
FIG. 2 illustrates a block diagram of a transmitter and a receiver for implementing various methods of the present invention.

FIG. 2 illustrates exemplary OFDM transmitter components in the form of an IFFT 20 and a parallel-to-serial converter ("PSC") 21 for generating a synchronization symbol periodically as known in the art. The synchronization symbol consists of a sequence of either known or unknown data symbols $DS_1$–$DS_X$ transmitted on the even numbered OFDM sub-carriers, and null symbols $NS_1$–$NS_X$ transmitted on the unused odd-numbered OFDM sub-carriers. One skilled in the art will appreciate that additional null symbols can be included on subcarriers near the edges of the channel bandwidth to provide a frequency guard band to simplify practical implementation issues. These additional null symbols near the band edges do not affect the similarity properties as subsequently described herein.

The data symbols $DS_1$–$DS_X$ interlaced with the null symbols $NS_1$–$NS_X$ yield a transmitted baud waveform BW. In the absence of an excess delay spread, the baud waveform BW as received by an OFDM receiver 30 will include two identical segments (e.g., a segment FH1 and a segment SH1 illustrated in FIG. 3) having a similarity that is preserved after propagating over a communication medium to the receiver 30 (ignoring noise). However, when an excess delay spread is present, the baud waveform BW as received by the receiver 30 will include two dissimilar segments (e.g., a first segment FH2 and a second segment SH2 exemplary illustrated in FIG. 4).

Figure 3:
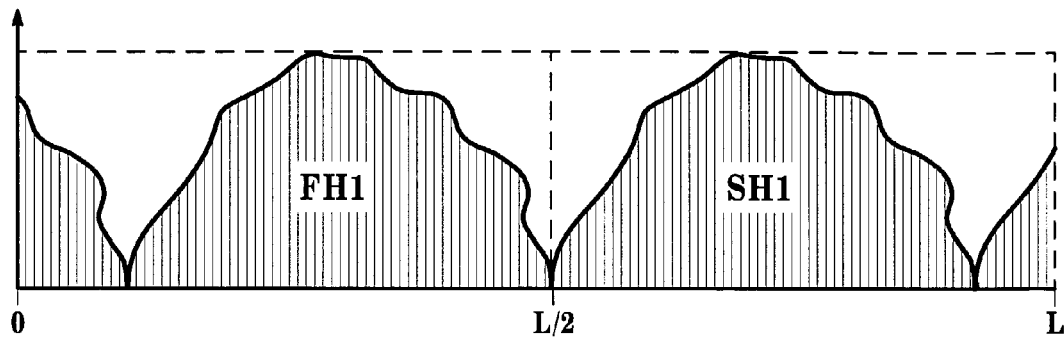
FIG. 3 illustrates an exemplary diagram of a received signal exhibiting similar properties as known in the art.
Figure 4:
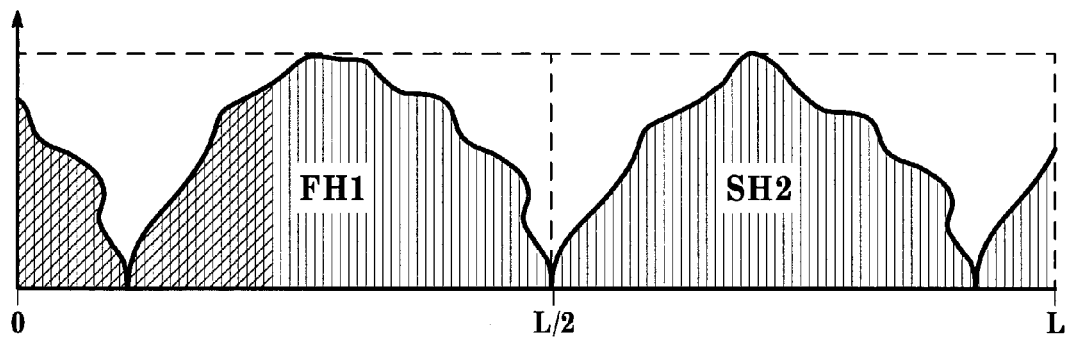
FIG. 4 illustrates an exemplary diagram of a received signal exhibiting dissimilar properties resulting from an excess delay spread.

Specifically, assuming that the symbol duration is L and the FFT size is N, the guard interval is (L-N). This guard interval is also known as a cyclic extension, which can be a cyclic prefix, cyclic postfix, or a split cyclic extension consisting of both a cyclic prefix and postfix. For purposes of facilitating an understanding of the invention, the various embodiments described herein are based on a split cyclic extension as illustrated in FIG. 1, FIG. 3 and FIG. 4. Also, the descriptions are based on a length of a channel impulse response (a.k.a. delay spread) being M and the channel impulse response being causal with discrete samples from 0 to M−1. From the descriptions, those having ordinary skill in the art will appreciate the applicability of the invention to other cyclic extension types and to continuous-time waveforms and channels. When M is less than the guard interval of L-N samples (the maximum distortion-free delay spread for the received signal), two similar portions of the baud waveform BW would be [(L-N+1) to (L-N/2)] and [(L-N/2+1) to L]. In the present invention, it has been determined that any delay spread in excess of M samples would disturb the similarity properties of the synchronization symbol in these portions. To make a decision on the presence of delay spread beyond M samples, the OFDM receiver 30 implements an excess delay spread detection method in accordance with the present invention.

Figure 5:
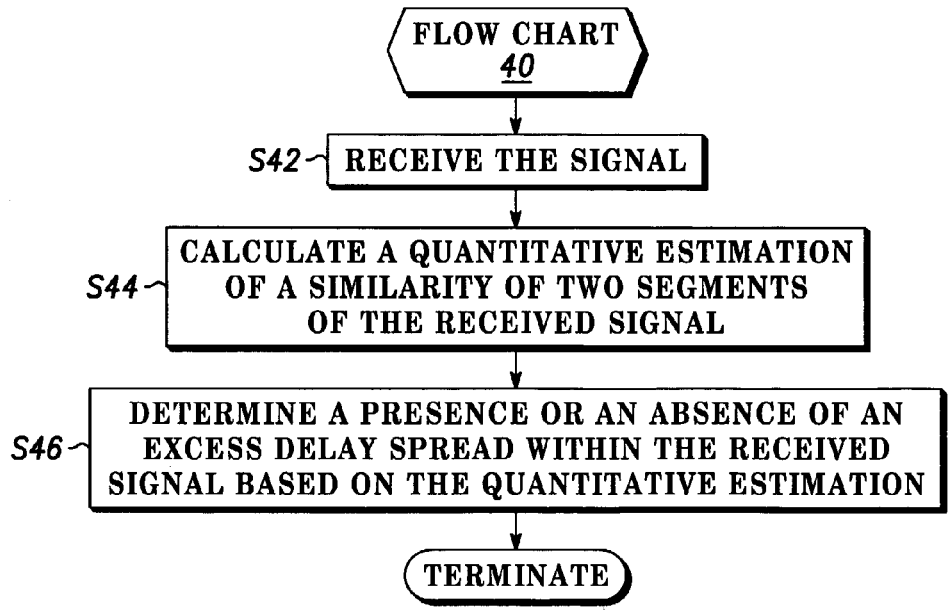
FIG. 5 illustrates a flowchart representative of an excess delay spread detection method in accordance with the present invention.

FIG. 5 illustrates a flowchart 40 representative of the excess delay spread detection method of the present invention. During a stage S42 of the flowchart 40, a signal, which consists of data symbols $DS_1$–$DS_X$ and the null symbols $NS_1$–$NS_X$ followed by the transformation and the conversion as shown in FIG. 2, is received by the OFDM receiver 30 after passing through a communication channel with the channel impulse response of length M. During a stage S44 of the flowchart 40, one or more quantitative estimations of a similarity of two segments of the received signal are performed by the OFDM receiver 30. In one embodiment, a quantitative estimation method in accordance with the present invention is implemented during stage S44.

Figure 6:
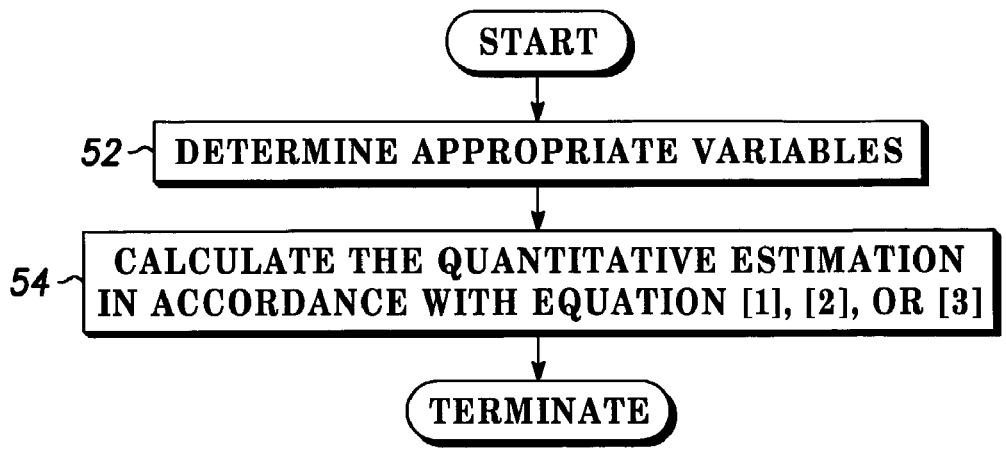
FIG. 6 illustrates a flowchart representative of one embodiment of a quantitative estimation method in accordance with the present invention.

FIG. 6 illustrates a flowchart 50 representative of the quantitative estimation method of the present invention. During a stage S52 of the flowchart 50, values of appropriate variables are determined and/or retrieved if they have been previously determined. In a typical embodiment, the values for the symbol duration L, FFT size N, and a small fraction m of N are predetermined based on system parameters, and the values S(1), S(2), . . . , S(L), are the signal samples of the received synchronization symbol.

During a stage S54 of the flowchart 50, a quantitative estimation $QE_1$, a quantitative estimation $QE_2$, or a quantitative estimation $QE_3$ is calculated. A calculation of a quantitative estimation $QE_1$ is executed in accordance with the following equation [1]:

$$QE_1 = \frac{20}{P}\log_{10}\left(\frac{\frac{1}{m}\sum_{n=1}^{m}|S(L-N+n)-S(L-(N/2)+n)|^P}{\frac{1}{m}\sum_{n=1}^{m}|S(L-(N/2)-m+n)-S(L-m+n)|^P}\right) \quad [1]$$

In a preferred embodiment, P=1, but other values including but not limited to P=2 or P=4 can also be used. The quantitative estimation $QE_1$ is a numerical comparison of two portions or segments of the received signal that are similar when there is no delay spread and dissimilar when there is excess delay spread. The numerator in the equation [1] represents the mean magnitude of the difference vector of length m samples beyond the beginning (L-N) samples of the signal (guard interval). This quantity should be on the order of the standard deviation of the noise in the received signal if there is no excess delay spread, but will be much larger if there is excess delay spread. The denominator represents the mean magnitude of the noise in the last m samples of portions of the signal that remain similar. This is used as a normalizing factor for the mean magnitude estimate of the difference vector in the first m samples of the similar portions of the signal. The assumption is that the delay spread is less than (L-(N/2)-m) and the last m samples of the similar portions are uncorrupted. If there is no excess delay spread, the noise corrupts the expected similarity of the numerator and denominator segments of the signal equally and the quantitative estimation $QE_1$ will be close to 0 dB; if there is excess delay spread, the similarity of the numerator segments will be corrupted by excess delay spread and noise to a greater extent than the denominator segments corrupted by noise only, and the quantitative estimation is expected to be larger than 0 dB.

The quantitative estimation $QE_2$ is formulated to detect excess delay spreads before the 0-th sample for a non-causal channel impulse response encountered when the received signal synchronization is early. To detect early excess delay spread assuming no late excess delay spread, a calculation of quantitative estimation $QE_2$ is executed in accordance with the following equation [2]:

$$QE_2 = \frac{20}{P}\log_{10}\left(\frac{\frac{1}{m}\sum_{n=1}^{m}|S(L-(N/2)-m+n)-S(L-m+n)|^P}{\frac{1}{m}\sum_{n=1}^{m}|S(L-N+n)-S(L-(N/2)+n)|^P}\right) \quad [2]$$

In equation [2], the roles of the numerator and denominator of equation [1] are reversed since the last m samples of the similar portions are corrupted by early excess delay spread, while it is assumed no late excess delay spread is present and hence the first m samples are uncorrupted.

The quantitative estimation $QE_3$ is formulated to detect either early or late excess delay spread. A calculation of quantitative estimation $QE_3$ is executed in accordance with the following equation [2]:

$$QE_3 = \frac{20}{P}\log_{10}\left(\frac{\frac{1}{m}\sum_{n=1}^{m}|S(L-(N/2)-m+n)-S(L-m+n)|^P + |S(L-N+n)-S(L-(N/2)+n)|^P}{\frac{1}{m}\sum_{n=1}^{m}|S(L-(3N/4)+n)-S(L-(N/4)+n)|^P}\right) \quad [3]$$

where now the beginning of the expected similar portions is corrupted by late excess delay spread if present, the end of the expected similar portions is corrupted by early excess delay spread if present, and the center of the expected similar portions is assumed corrupted by noise only and no excess delay spread.

Note that the above quantitative estimations $QE_1$–$QE_3$ are formulated based on an assumption that the transmitter transmitted a signal having two identical segments. The invention can also handle the ease where the two segments of the transmitted signal are identical within a complex constant, as long as the constant is known at the receiver 30. For example, if the frequency domain data symbols $DS_1$–$DS_X$ are interleaved with the null symbols $NS_{1-NSX}$ on the odd rather than the even subcarriers, the second segment of the received signal will equal the negative of the first segment in the absence of excess delay spread and noise. The invention can either compensate for the known constant prior to a calculation of one of the quantitative estimations $QE_1$–$QE_3$, or the equations [1]–[3] can be modified to take the constant into account.

Referring again to FIG. 5, during a stage S46 of the flowchart 40, a presence or an absence of an excess delay spread within the received signal is determined based on the quantitative estimation. In one embodiment, an excess delay spread determination of the present invention is implemented during the stage S46.

Figure 7:
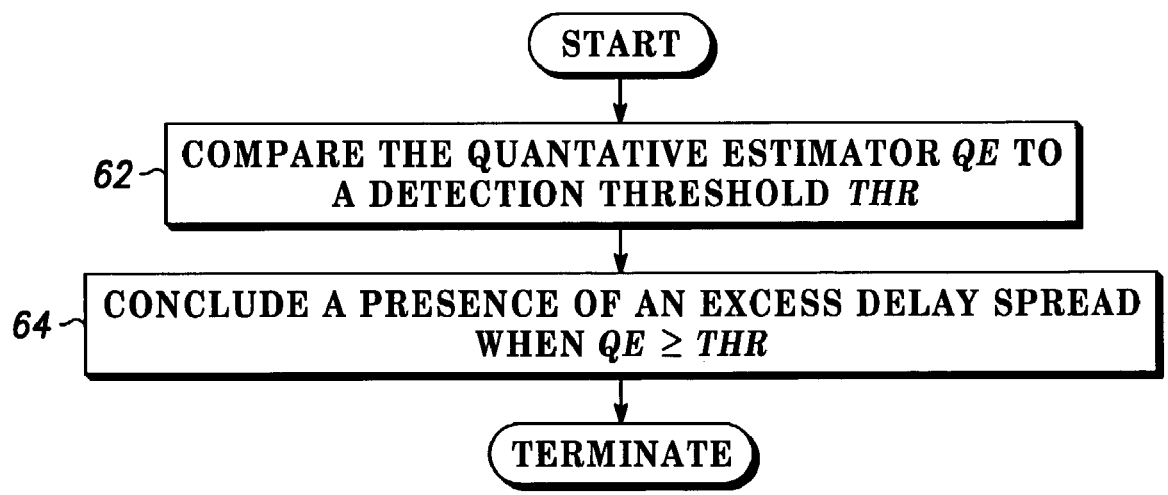
FIG. 7 illustrates a flowchart representative of one embodiment of an excess delay spread detection method in accordance with the present invention.

FIG. 7 illustrates a flowchart 60 representative of the excess delay spread detection method of the present invention. During a stage S62 of the flowchart 60, the quantitative estimation calculated during stage S54 (FIG. 6) is compared to a corresponding detection threshold. In one embodiment, the quantitative estimation $QE_1$ is compared to a detection threshold $THR_1$ when quantitative estimation $QE_1$ was calculated during stage S54, the quantitative estimation $QE_2$ is compared to a detection threshold $THR_2$ when quantitative estimation $QE_2$ was calculated during stage S54, and/or the quantitative estimation $QE_3$ is compared to a detection threshold $THR_3$ when quantitative estimation $QE_3$ was calculated during stage S54.

The detection thresholds $THR_1$–$THR_3$ are preferably selected to achieve a high probability of detection and a low probability of false alarm for the types of channels and signal-to-(noise and interference) ratios expected during system usage. The probability of detection is the probability of detecting the presence of excess delay spread given that the channel has excess delay spread and the probability of false alarm is the probability of erroneously detecting the presence of excess delay spread given that the channel has no excess delay spread. There is no limit to a numerical range of the detection thresholds $THR_1$–$THR_3$. Furthermore, all of the detection thresholds $THR_1$–$THR_3$ can be identical (e.g., 7 dB), or one or all three of the detection thresholds $THR_1$–$THR_3$ can be different.

During a stage S64 of the flowchart 60, a presence of an excess delay spread is assumed when the comparison of stage S62 determines the calculated quantitative estimation is equal to or greater than a corresponding detection threshold (i.e., $QE_1$ $THR_1$, $QE_2$ $THR_2$, and/or $QE_3$ $THR_3$).

Referring again to FIG. 5, the flowchart 40 is terminated upon completion of stage S46. For each signal propagated thereafter to the receiver 30, flowchart 40 will be implemented wherein either quantitative estimation $QE_1$, quantitative estimation $QE_2$, or quantitative estimation $QE_3$ are calculated during an implementation of stage S54 (FIG. 6) in view of a desired early, late, or early/late detection of an excess spread delay, respectively.

Figure 8:
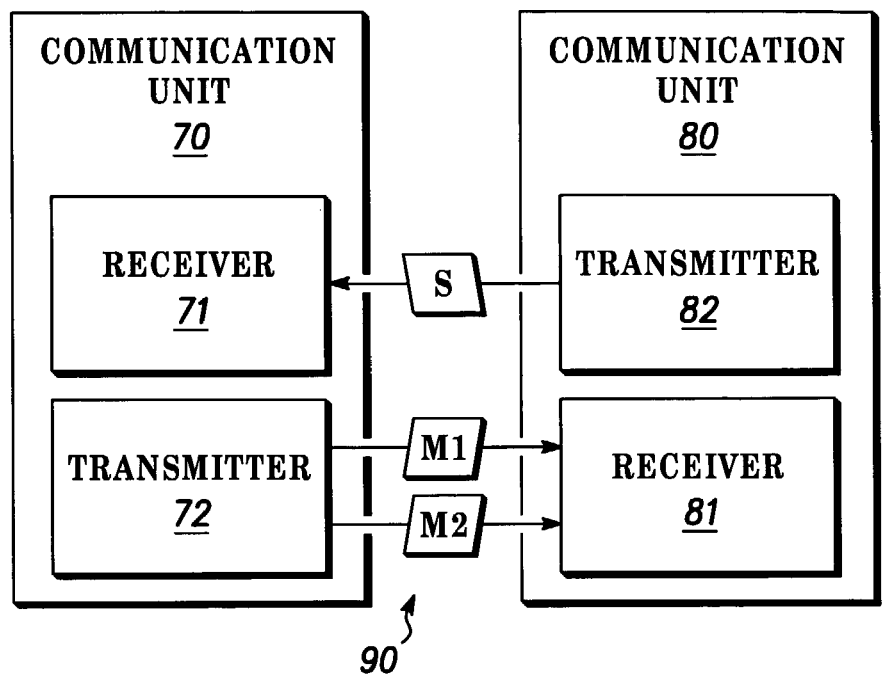
FIG. 8 illustrates an interaction of a pair of communication units employing various methods of the present invention.

FIG. 8 illustrates a communication unit 70 and a communication unit 80. The communication unit 70 includes a receiver 71 and a transmitter 72, and the communication unit 80 includes a receiver 81 and a transmitter 82. The present invention is employed within the communication unit 70 and/or the communication 80 to determine a presence of excess delay spread in a communication channel 90 between the communication unit 70 and the communication 80. In one embodiment, the receiver 71 receives a signal S transmitted by the transmitter 82 passing through the communication channel 90. The signal S as received by the receiver 71 either has segments exhibiting similar properties in the absence of an excess delay spread in the communication channel 90 as exemplary illustrated in FIG. 3, or segments exhibiting dissimilar properties due to the presence of an excess delay spread in the communication channel 90 as exemplary illustrated in FIG. 4. Upon reception of the signal S, the receiver 71 implements the excess spread detection method of the present invention represented by the flowchart 40 illustrated in FIG. 5 to determine whether an excess delay spread is present in the communication channel 90 based upon a quantitative estimation of a similarity of two segments of the received signal. In one embodiment, if the presence of excess delay spread in the communication channel 90 is detected by the receiver 71, then the transmitter 72 transmits a message M1 to the receiver 81 to indicate the detection of the presence of excess delay spread in the communication channel 90. If the receiver 71 detects the absence of excess delay spread in the communication channel 90, the transmitter 72 can optionally transmit a message M2 to the receiver 81 to indicate an absence of excess delay spread in the communication channel 90.

Figure 9:
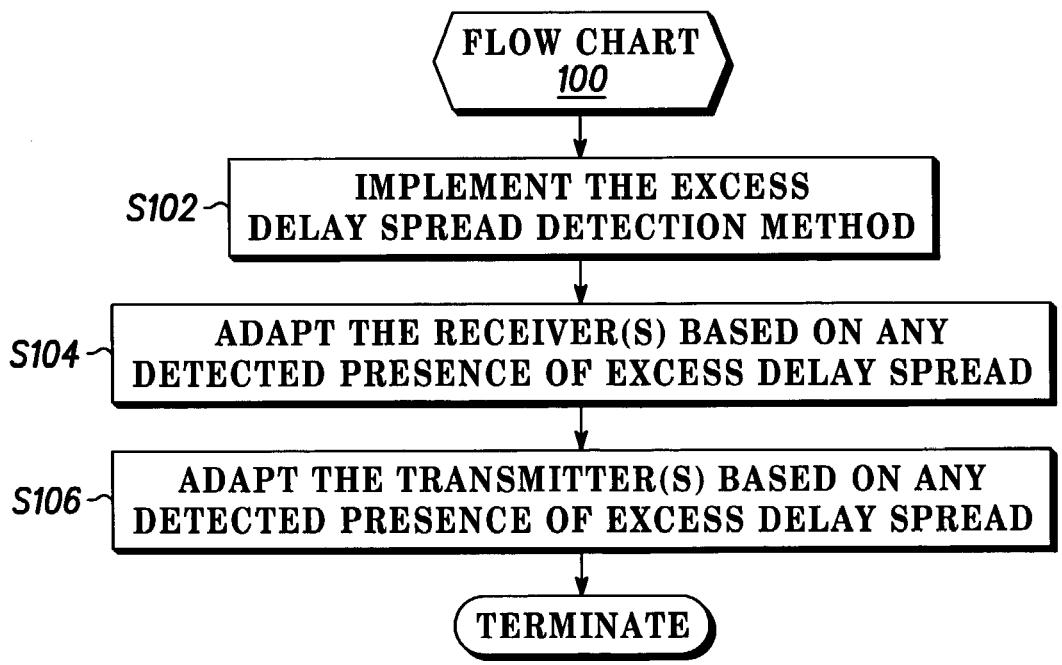
FIG. 9 illustrates a flowchart representative of one embodiment of a communication system adaptation method in accordance with the present invention.

FIG. 9 illustrates flowchart 100 representative of a communication system adaptation method in accordance with the present invention. To facilitate an understanding of the communication adaptation method of the present invention, the flowchart 100 will be described based upon an implementation of the flowchart 100 by the receiver 71 (FIG. 8) and the transmitter 72 (FIG. 8).

During a stage S102 of the flowchart 100, the receiver 71 implements the excess spread detection method of the present invention represented by the flowchart 40 illustrated in FIG. 5 to determine whether an excess delay spread is present or absent in a received signal based upon a quantitative estimation of a similarity of two segments of the received signal.

During a stage S104 of the flowchart 100, the receiver 71 (FIG. 8) and/or the receiver 81 (FIG. 8) is(are) adapted based on any detected presence of excess delay spread in the received signal S. In one embodiment, an adaptation of the receiver 71 and/or the receiver 81 encompasses a determination of the coefficients of a filter used to interpolate and/or smooth complex channel gain estimates for the subcarriers of an OFDM signal. This filter is a channel estimation filter. When an OFDM signal includes known or pilot symbols on certain subcarriers, the receiver 71 and/or the receiver 81 compares a received pilot symbol to the known transmitted pilot symbol value to measure the complex channel gain on the subcarrier containing the pilot symbol. This process is repeated on each subcarrier having a pilot symbol to obtain a set of measurements. However, these measurements are sometimes too noisy to be used directly, so filtering can be used to reduce the noise (smoothing) and interpolate values of the complex channel gain between the subcarriers containing pilot symbols. In the presence of excess delay spread, the complex channel gain becomes less correlated between subcarriers and the channel estimation filter should perform less smoothing to improve the tracking of the increased channel variations. Thus, when excess delay spread is present, the channel estimation filter bandwidth can be increased (the bandwidth of the filter is related to the Fourier transform of the filter coefficients).

In a second embodiment, two channel estimation filters with different bandwidths are stored in the receiver 71 and/or the receiver 81, and a determination of the coefficients of the filter includes a selection of the coefficients of one of the filters based on the presence of excess delay spread.

Those having ordinary skill in the art will appreciate an adaptation of the receiver 71 and/or the receiver 81 is based on the presence of excess delay spread can also be advantageously applied to other portions, methods, and algorithms of a receiver.

During a stage S106 of the flowchart 100, the transmitter 72 (FIG. 8) and/or the transmitter 82 (FIG. 8) is(are) adapted based on any detected presence of excess delay spread in the received signal S. In one embodiment, a cyclic prefix length used by the transmitter 72 and/or the transmitter 82 is adapted based on the detected presence of excess delay spread in the received signal.

In alternative embodiments of the flowchart 100, either stage S104 or stage S106 can be omitted.

Referring again to FIG. 8, when the presence of excess delay spread is detected by the receiver 71, the receiver 71 can be adapted without the need for communication unit 70 to transmit the message M1 or the message M2 from the transmitter 72. It is preferred nonetheless that communication unit 70 transmits the message M1 to communication unit 80 when it adapts transmitter 72. In such a case, the message M1 preferably includes additional information about the adaptation of transmitter 72 whereby the communication unit 80 will be informed of changes to the transmit signal properties.

As to the communication unit 80, if the receiver 81 or transmitter 82 are to be adapted based on the detected presence of excess delay spread by the receiver 71, the transmission of the message M1 is required to inform the communication unit 80 of the detected presence of excess delay spread whereby the receiver 81 and/or the transmitter 82 can be properly adapted.

The receiver 30 (FIG. 2), the receiver 71 (FIG. 8), the transmitter 72 (FIG. 8), the receiver 81 (FIG. 8) and the transmitter 82 (FIG. 8) may employ hardware (analog or digital), software, or any combination of hardware and software for implementing various stages of the one or more methods of the present invention.

The present invention may be embodied in other specific forms without departing from its spirit or essential characteristics. For example, the mathematical principles of linearity and superposition may enable the re-ordering of certain steps of the described embodiments, or may enable additional specific embodiments having essentially the same function, and that such variations are within the scope of the present invention. In another example, upon determination of the presence of the excess delay spread, the metrics disclosed herein could be determined for various window sizes and/or starting positions in order to determine the length of the excess delay spread. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention is not limited to multi-carrier communication systems. For example, a waveform with similar segments can be transmitted periodically in a conventional single-carrier system. The methods presented in the invention can then be applied to detect the presence of excess delay spread with appropriate redefinition of the variables.

We claim:

1. A method for operating a receiver in detecting a presence of an excess delay spread within a received signal, said method comprising:

calculating a quantitative estimation QE of a similarity of two segments of the received signal, wherein calculating the quantitative estimation QE comprises using a representation of a mean magnitude of a difference vector of length m samples beyond the beginning (L-N) samples of the received signal, wherein L is a symbol duration, N is a fast Fourier transform size, and m is a fraction of N; and determining the presence or an absence of the excess delay spread in the received signal based upon the quantitative estimation.

2. The method of claim 1, wherein a calculation of the quantitative estimation QE is according to:

$$QE = \frac{20}{P}\log_{10}\left(\frac{\frac{1}{m}\sum_{n=1}^{m}|S(L-N+n)-S(L-(N/2)+n)|^P}{\frac{1}{m}\sum_{n=1}^{m}|S(L-(N/2)-m+n)-S(L-m+n)|^P}\right); \text{ and}$$

wherein L is a symbol duration, N is a fast Fourier transform size, m is a fraction of N, S are signal samples, and P is an integer.

3. The method of claim 1, wherein a calculation of the quantitative estimation QE is according to:

$$QE = \frac{20}{P}\log_{10}\left(\frac{\frac{1}{m}\sum_{n=1}^{m}|S(L-(N/2)-m+n)-S(L-m+n)|^P}{\frac{1}{m}\sum_{n=1}^{m}|S(L-N+n)-S(L-(N/2)+n)|^P}\right); \text{ and}$$

wherein L is a symbol duration, N is a fast Fourier transform size, m is a fraction of N, S are signal samples, and P is an integer.

4. The method of claim 1, wherein a calculation of the quantitative estimation QE is according to:

$$QE = \frac{20}{P}\log_{10}\left(\frac{\frac{1}{m}\sum_{n=1}^{m}|S(L-(N/2)-m+n)-S(L-m+n)|^P + |S(L-N+n)-S(L-(N/2)+n)|^P}{\frac{1}{m}\sum_{n=1}^{m}|S(L-(3N/4)+n)-S(L-(N/4)+n)|^P}\right); \text{ and}$$

wherein L is a symbol duration, N is a fast Fourier transform size, m is a fraction of N, S are signal samples, and P is an integer.

5. A method of operating a receiver in detecting a presence of an excess delay spread within a received signal, said method comprising:

calculating a quantitative estimation of a similarity of two segments of the received signal, wherein calculating the quantitative estimation comprises using a representation of a mean magnitude of a difference vector of length m samples beyond the beginning (L-N) samples of the received signal, wherein L is a symbol duration, N is a fast Fourier transform size, and m is a fraction of N; and determining the presence or an absence of the excess delay spread in the received signal based on a comparison of the quantitative estimation and a detection threshold.

6. The method of claim 5, wherein a calculation of the quantitative estimation QE is according to:

$$QE = \frac{20}{P}\log_{10}\left(\frac{\frac{1}{m}\sum_{n=1}^{m}|S(L-N+n)-S(L-(N/2)+n)|^P}{\frac{1}{m}\sum_{n=1}^{m}|S(L-(N/2)-m+n)-S(L-m+n)|^P}\right) ; \text{ and}$$

wherein L is a symbol duration, N is a fast Fourier transform size, m is a fraction of N, S are signal samples, and P is an integer.

7. The method of claim 5, wherein a calculation of the quantitative estimation QE is according to:

$$QE = \frac{20}{P}\log_{10}\left(\frac{\frac{1}{m}\sum_{n=1}^{m}|S(L-(N/2)-m+n)-S(L-m+n)|^P}{\frac{1}{m}\sum_{n=1}^{m}|S(L-N+n)-S(L-(N/2)+n)|^P}\right) ; \text{ and}$$

wherein L is a symbol duration, N is a fast Fourier transform size, m is a fraction of N, S are signal samples, and P is an integer.

8. The method of claim 5, wherein a calculation of the quantitative estimation QE is according to:

$$QE = \frac{20}{P}\log_{10}\left(\frac{\frac{1}{m}\sum_{n=1}^{m}|S(L-(N/2)-m+n)-S(L-m+n)|^P + |S(L-N+n)-S(L-(N/2)+n)|^P}{\frac{1}{m}\sum_{n=1}^{m}|S(L-(3N/4)+n)-S(L-(N/4)+n)|^P}\right) ; \text{ and}$$

wherein L is a symbol duration, N is a fast Fourier transform size, m is a fraction of N, S are signal samples, and P is an integer.

9. A receiver, comprising:
means for calculating a quantitative estimation QE of a similarity of two segments of a received signal, wherein calculating the quantitative estimation QE comprises using a representation of a mean magnitude of a difference vector of length m samples beyond the beginning (L-N) samples of the received signal, wherein L is a symbol duration, N is a fast Fourier transform size, and m is a fraction of N; and
means for determining the presence or an absence of the excess delay spread in the received signal based upon the quantitative estimation.

10. A method for operating a first communication unit in detecting a presence of an excess delay spread in a communication channel between the first communication unit and a second communication unit, said method comprising:
receiving a signal over the communication channel from the second communication unit, the signal having a first segment and a second segment; and
determining the presence or an absence of the excess delay spread in the received signal based upon a quantitative estimation of a similarity of the first segment and the second segment, wherein the quantitative estimation is determined using a representation of a mean magnitude of a difference vector of length m samples beyond the beginning (L—N) samples of the received signal, wherein L is a symbol duration, N is a fast Fourier transform size, and m is a fraction of N.

11. The method of claim 10, further comprising:
transmitting a message to the second communication unit upon a determination of presence of the excess delay spread in the received signal, the message indicating the presence of the excess delay spread in the communication channel.

12. The method of claim 10, further comprising:
adapting the operation of the first communication unit in view a determination presence of the excess delay spread in the received signal.

13. A method for adapting a receiver in a communication unit, said method comprising:
receiving a signal which was transmitted with a first segment and a second segment;
determining a presence or an absence of an excess delay spread in the received signal based upon a quantitative estimation of a similarity of the first segment and the second segment, wherein the quantitative estimation is determined using a representation of a mean magnitude of a difference vector of length m samples beyond the beginning (L-N) samples of the received signal, wherein L is a symbol duration, N is a fast Fourier transform size, and m is a fraction of N; and
adapting the receiver based upon the detected presence of the excess delay spread in the signal in response to a determination of the presence of the excess delay spread in the received signal.

14. The method of claim 13, wherein the act of adapting the receiver includes determining one or more coefficients of a channel estimation filter in the receiver.

* * * * *